United States Patent [19]

Engler et al.

[11] Patent Number: 4,493,217

[45] Date of Patent: Jan. 15, 1985

[54] PROCESS AND APPARATUS FOR MEASURING TRAVEL TIME DIFFERENCES OF ULTRASONIC PULSES FOR THE DETERMINATION OF FLOW FIELDS

[75] Inventors: Rolf Engler; Rudolf Wulf, both of Göttingen, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 408,862

[22] Filed: Aug. 17, 1982

[30] Foreign Application Priority Data

Aug. 18, 1981 [DE] Fed. Rep. of Germany ....... 3132526

[51] Int. Cl.³ .............................................. G01F 1/66
[52] U.S. Cl. .................................. 73/861.27; 73/597; 73/601
[58] Field of Search ................. 73/147, 606, 607, 601, 73/597, 608, 861.27, 861.28, 861.29, 861.31; 340/89

[56] References Cited

U.S. PATENT DOCUMENTS

| | | | |
|---|---|---|---|
| 3,836,950 | 9/1974 | Bhuta et al. | 73/608 |
| 4,006,627 | 2/1977 | Bossaert | 73/608 |
| 4,028,938 | 6/1977 | Eck | 73/861.31 |
| 4,174,634 | 11/1979 | Dory | 73/606 |

OTHER PUBLICATIONS

Dragonette, "Schlieven Visualization of Radiation Caused by Illumination of Plates with Acoustical Pulses", in Jour. Acous. Soc. Amer., vol. 3, part 2, 1972, 6/77.
Measurement of Vortices in Wind Tunnel Experiments by Use of Ultrasonic Pulses, I.C.I.A.S.F. Record, Sep. 1979, by R. H. Engler, H. Holst, D. W. Schmidt & R. Wulf (8 pages).

Primary Examiner—Herbert Goldstein
Attorney, Agent, or Firm—Thomas & Kennedy

[57] ABSTRACT

Laser beams are modulated by ultrasonic pulses transmitted through gaseous media as a means of determining flow field patterns and temperatures without disturbing the test media.

9 Claims, 3 Drawing Figures

PROCESS AND APPARATUS FOR MEASURING TRAVEL TIME DIFFERENCES OF ULTRASONIC PULSES FOR THE DETERMINATION OF FLOW FIELDS

TECHNICAL FIELD

The invention relates to a process for the measurement of travel time differences of ultrasonic pulses for the determination of flow fields, in particular of velocity components in gaseous media, in which at least one ultrasonic pulse is sent through the medium by means of an ultrasonic transmitter and the travel time of the ultrasonic pulse is registered by means of a receiver. The invention likewise shows an apparatus for carrying out the process, which makes it possible to measure still further characteristic data of a flow field besides velocity components, and in fact, for example, the temperature or paths.

BACKGROUND OF THE INVENTION

It is known, in the measurement of travel time differences of ultrasonic pulses, to utilize ultrasonic transducers as transmitter and also as receiver in flow field investigations in wind tunnels. The ultrasonic transducers have a relatively large housing and require extensive mountings and special current supplies. The considerable spatial extent of such an ultrasonic transducer and the associated auxiliary devices often leads to disturbances in the wind tunnel which make the measurement results useless. Particularly in closed tunnels, a great change in the flow cross section results from the arrangement of the measuring equipment, such that in many cases the measurement results are unreasonably distorted. Also, several successive measurements often have to be made to survey a flow field, and the ultrasonic transducer has to be displaced between them. Only stationary flows can be investigated in this manner, or such instantaneous processes in which knowledge of the expected course of the flow process with time (e.g., in the special case of periodicity) can solve the measuring process at the respective correct instant of time. Here, however, relatively long measurement times are concerned. The possibilities of use of such an ultrasonic transducer are strongly restricted to special cases. Since the ultrasonic transducer must couple the ultrasonic pulses to the measurement region, the flow field is impaired both at the beginning, i.e. at the input coupling point, and also at the end, by the presence of the ultrasonic transducer. This impairment only disappears when a smaller distance can be taken as the integration region than the distance between the two ultrasonic transducers, which can be achieved in practice in special cases by corresponding measures.

An ultrasonic transducer is disclosed in Federal Republic of Germany Patent No. DE-PS 31 03 357. in which special receiving microphones are used which must vibrate in resonance with the incoming signal. The change of the integration path in the flow field requires a considerable cost in apparatus and modification of the measurement device. In each case there is required in the flow field a receiving microphone as a probe, which in the special case can also be arranged outside the measurement region. A temperature measurement is not possible without insertion of a probe into the measurement region or at the measurement point.

Known laser measurement processes (e.g., laser doppler, two-focus procedure, etc.) do not permit any integration path to be built up or any instantaneous measurements to be carried out. The time required to survey a flow field with the usual laser measurement processes is considerably greater than with the ultrasonic measurement method.

The object of the invention is to teach a process and an apparatus by means of which travel time differences can be measured, in the measurement region of interest without contact (without disturbing probes), for ultrasonic pulses, and the measurement region can be selected without influencing the flow.

Stationary and instantaneous flow fields are to be measured such that path integrals of flow components can be determined, e.g. for the estimation of vortex parameters. On the one hand it is to be possible to integrate over long paths (e.g. in detection of vortices), and on the other hand it is also to be possible to integrate over short paths, in order to achieve a more or less pointwise determination of flow components. Since the temperature is important from various viewpoints in flow processes, in particular with compressive flow, it is also to be possible to determine this temperature. The equipment required for the process is also to be able to be fitted, without disturbance, outside the flow field to be investigated, and in fact also in closed wind tunnels. Furthermore, it is to be possible to make measurements at, or from, great distances. By a rapid sequential or even parallel operation of the equipment, instantaneous as well as stationary flow processes are to be recordable.

SUMMARY OF THE INVENTION

According to the invention, this is achieved in the process of the kind described at the beginning, in that as receiver for the ultrasonic pulse one or more laser beams are used which are modulated at the intersection by the ultrasonic pulse, and the modulation of which is recorded. While up to now an ultrasonic transducer was used in the state of the art as a receiver, i.e., a concrete bodily object, which necessarily disturbed the flow field by its presence, a laser beam is now utilized as receiver for the ultrasonic pulse, operating without contact at the measurement point or in the measurement region, and thus in no way disturbs the flow field. The laser beam is altered, or modulated with the ultrasonic pulse, by the meeting of the ultrasonic pulse and the laser beam at the intersection point.

GENERAL DESCRIPTION

Laser beams can be transported, as is well known, over relatively large distances without more ado, so that the modulation can be registered outside the flow field. Hence there arises an optico-acoustic method which makes possible the investigation of stationary and instantaneous flow processes—even with simultaneous temperature determination—in the smallest regions of flow fields and without displacement of the measurement arrangement. No small microphones are necessary as receivers, since this function is taken over by the laser beam. The corresponding ultrasonic transmitter can, without disturbance, be arranged relatively far from the flow field to be measured. Since ultrasonic signals of very high frequencies can be emitted, distance or range measurements can also be carried out by means of the laser beam intersecting the ultrasonic signal, in particular as a so-called null measurement in calm flow medium for measuring the geometrical data of the equipment. The apparatus itself thus requires no maintenance of precise tolerances of arrangement of the transmitters and receivers with respect to each other.

Both the emission of the ultrasonic pulse and also the registration of the modulation can be carried out line by line, a number of intersection points being formed between the ultrasonic pulses and the laser beams and the respective data being registered. The great advantage of this process is that any desired integration paths can be built up or selected, according to the spacing of the laser beams from each other, and in fact with the necessity only for a very small alteration in the construction of the apparatus. The measurements can be carried out much more rapidly than was previously possible. While up to now, with the conventional processes (laser-doppler, hole probes, hot wire, etc.) the measurement time lasted about a day for the measurement of a flow field of, e.g., 3 m × 3 m, with a measurement point spacing of about 1 cm, such a measurement can be carried out by the new process in about 1 minute or even more rapidly. Over and above this, targeted very small flow regions can be investigated, and without bringing any kind of probe into the flow field.

Short ultrasonic pulses of about 100 kHz up to 1 MHz can be emitted which pass through the laser beams as compression or density waves, as a result of which the laser beam is deflected and the thereby modulated laser beam is received. Here the modulated laser beam can first be conducted out of the flow field to be measured and only registered when outside the flow field, so that no negative influence on the flow field takes place. When several laser beams are used, large or small integration paths can be provided at will by selection of the laser beams concerned, without any displacement of the apparatus or other alteration, so that the flow field can be investigated, even in the edge region, without disturbing influences.

For local temperature determination, ultrasonic pulses can be sent from opposed directions onto the same laser beams. It is thus also possible to perform a local temperature measurement without contact. This is explainable from the fact that ultrasonic pulses spread out in the flow field at different rates at different temperatures. The rate can be determined with a line arrangement of laser beams with the corresponding subsequent pickup unit, and a probe-free temperature determination can thus be carried out.

The apparatus for measurement of travel time differences of ultrasonic pulses for the determination of flow fields is characterized in that a laser emitting a laser beam and a pickup unit registering the laser beam are provided as the receiver, and that the receiver and the ultrasonic transmitter are arranged such that the ultrasonic pulse and the laser beam intersect at an intersection point. The measurement region, or the measurement point if the intersection points are closely spaced, is obtained between any two intersection points. Absence of contact is achieved by use of the laser beam as the essential part of the receiver unit. The modulation of the laser beam due to the ultrasonic pulse can be transported over relatively wide extents by means of the laser beam and can be recorded there outside the flow field or the measurement region with the pickup unit without disturbance.

For determination of a flow field, both a number of ultrasonic transmitters and also a number of receivers, essentially consisting of laser beams and pickup units, are arranged line by line at an angle to each other, so that a large number of intersection points result, which represent the measurement points. Integration can then take place between given points; this can be arranged without trouble by using a subsequent evaluation unit. The equipment does not have to be altered in any way for this, with the advantage that, e.g. in application in a wind tunnel, it can once be equipped with a device of this kind. The apparatus can then be used for the investigation of quite different bodies or flow fields without any alteration of apparatus. It is of particular advantage that this is also possible in closed wind tunnels.

Each pickup unit can essentially consist of a schlieren receiving optics with a following phototransistor, or also of a diode array. It will be understood that the number of pickup units agrees with the number of laser beams. Each laser beam can be produced by a separate laser, but can also be derived from a single laser, which is possible, for example, by use of a rotating mirror with a line of mirrors or the like. Various possibilities are open here to one skilled in the art. When the pickup unit is embodied as a schlieren receiving optics with following phototransistor, the light/dark procedure is used for registration of the modulation. When a diode array is used, the deflection of the laser beam by the compression wave of the ultrasonic pulse is used for determination of the said flow magnitudes.

For determination of velocity components in the three space directions, the transmitter and receiver are respectively arranged in two mutual planes.

The following can be mentioned as possible fields of use for the new process and the apparatus, but the list can be further extended:

Vortex and velocity fields, temperatures, paths and the like can be determined in open and also in closed wind tunnels. Vortex and velocity fields can also be determined on airports, the transportation means for the ultrasonic pulse here being a laser beam of medium energy, which can transmit this information, packaged, over far ranges. Furthermore, measurements on engines can be carried out, and in fact also velocity measurements up to, e.g., Mach 1. Temperature measurements can be carried out, resolution and accuracy depending on the density of laser beam positioning. As fields of application are obtained the measurement of engines and also the detection of frictional heat and any other flow processes in which a conversion of energy into heat occurs. Finally distance measurements can also be carried out to about 0.1 mm at a wavelength of 300 kHz [sic]. The frequency can be raised still higher. Such distance measurements are important for positioning of bodies and models or for monitoring and registering the vibrational behavior in aeroelastic investigations.

The mathematical physics determination magnitudes and their relationships, arising in connection with the invention, are as follows:

(a) in determination of primary travel times

If a constant temperature can be assumed along an integration path from A to B, then with $s = \overline{AB}$ $$c + v = s/t$$

$t$ = travel time
$c$ = speed of sound at temperature T
$v$ = flow velocity in direction of propagation of sound
$s$ = distance between A and B For determination of a vortex, the null point in the free flow at temperature T without velocity components in the direction of sound propagation is determined; this velocity is proportional to the travel time T. When a vortex is present, the flow velocity components in the direction of propagation of sound become effective and a sound travel time $t_1$ results. Then:

$$t - t_1 = t_w$$

is directly the time delay which is brought about by a velocity component of the vortex in the direction of propagation of sound.

(b) Determination of temperature

Using the parameters for determination of the travel time t, there is obtained for a flow component with propagation from A to B and the same direction of sound propagation:

$$c + v = s/t_1.$$

However, with the sound propagation direction opposed to the flow direction from A to B, or from B to A, there holds:

$$c - v = s/t_2.$$

Now, forming the sum, $$c + v + c - v = s/t_1 + s/t_2$$

$$c = \frac{s}{2}\left(\frac{1}{t_1} - \frac{1}{t_2}\right)$$

Since the running time $t_1$ and $t_2$ were measured, the temperature-dependent speed of sound can be calculated. Then:

$$c = 331.6 \cdot 1 + T$$

The sound propagation coefficient (temperature-independent)

$$\text{air} = 0.003674 \cdot 1/(°C.), \text{ where}$$

$$T = \text{temperature in °C. and}$$

$$331.6 \text{ m/s} = \text{speed of sound at 0° C.}$$

Thus the average temperature is given between A and B. If the distance $\overline{AB}$ is made very small, temperatures in very small regions can be determined.

BRIEF DESCRIPTION OF THE DRAWING

The process and the apparatus will be further explained and described with reference to the drawings, in which.

DETAILED DESCRIPTION OF THE DRAWING

Figure 1:
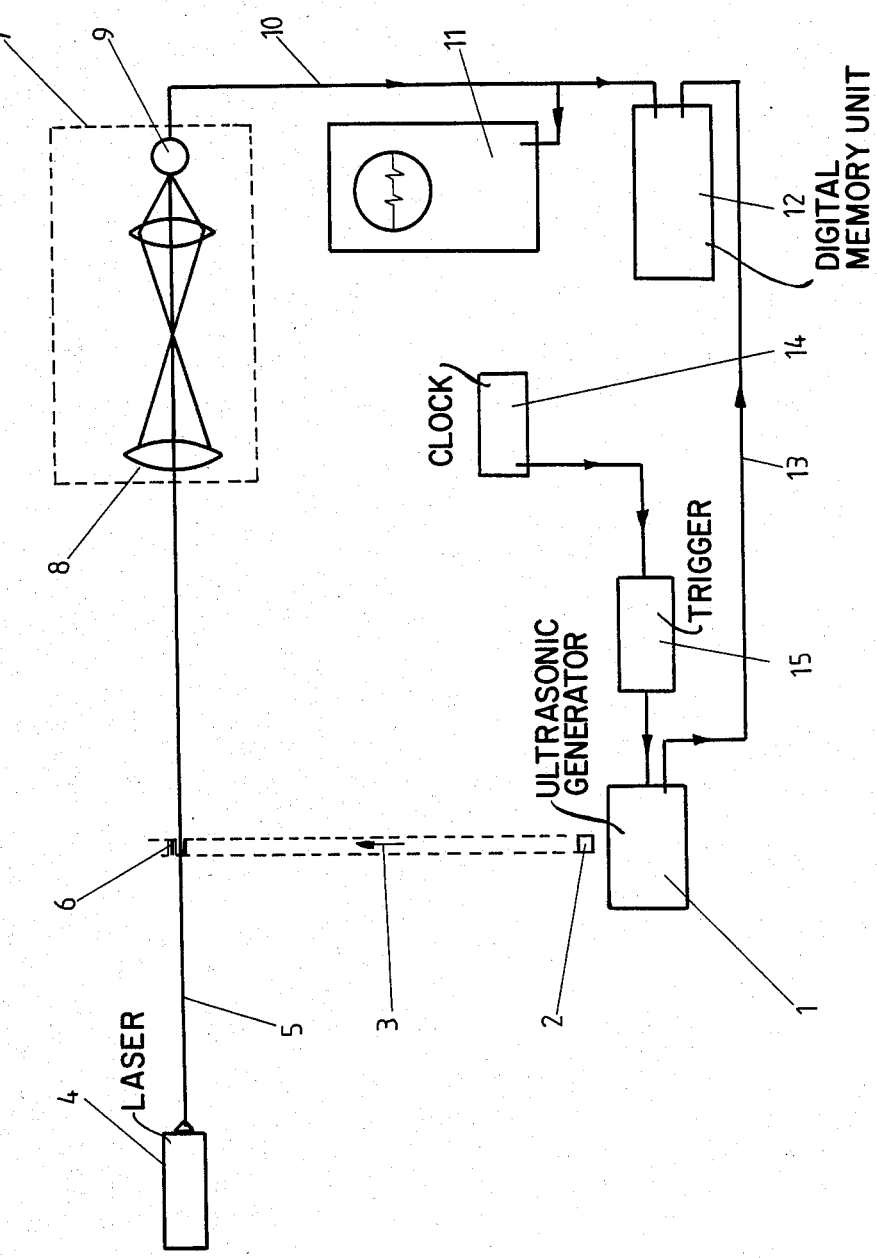
FIG. 1 is a schematic representation with only one transmitter, to illustrate the principle of the process

To explain the principle, FIG. 1 shows an ultrasonic generator (1) with an ultrasonic transmitter (2), which emits short, separate ultrasonic pulses according to arrow (3). The ultrasonic pulse represents a compression or density wave, which penetrates through the flowing medium which flows in a given direction to it.

A laser (4) sends a laser beam (5) out and is arranged such that the laser beam (5) and the ultrasonic pulse intersect. The distance between two intersection points represents a mesurement point or a measurement distance. At the intersection point, the ultrasonic pulse alters the laser beam (5) such that this contains a modulation imprinted on it. The laser beam (5) can be operated over relatively large distances without great widening of the beam and without the modulation being lost or indiscernable. Associated with the laser beam (5) a pickup unit (7) is arranged, and can consist of a schlieren optics (8) and a following phototransistor (9). Instead of the schlieren optics (8) and the phototransistor (9), a diode array can also be arranged. A signal lead (10) goes from the phototransistor to the oscillograph (11) on which the signals are made visible for later evaluation. Simultaneously, the signal lead (10) goes to a digital memory unit (12) in which are stored all ultrasonic pulses ever emitted, distinguished by their signals on the laser beam (5). A return lead (13) goes from the ultrasonic generator (1) to the digital memory unit (12). It is thereby ensured that when a pulse is again emitted the digital memory unit is ready to receive.

The ultrasonic generator (1) is preceded by a time generator (14) and a trigger (15), which exactly define the starting point of the emitted ultrasonic pulse.

Figure 2:
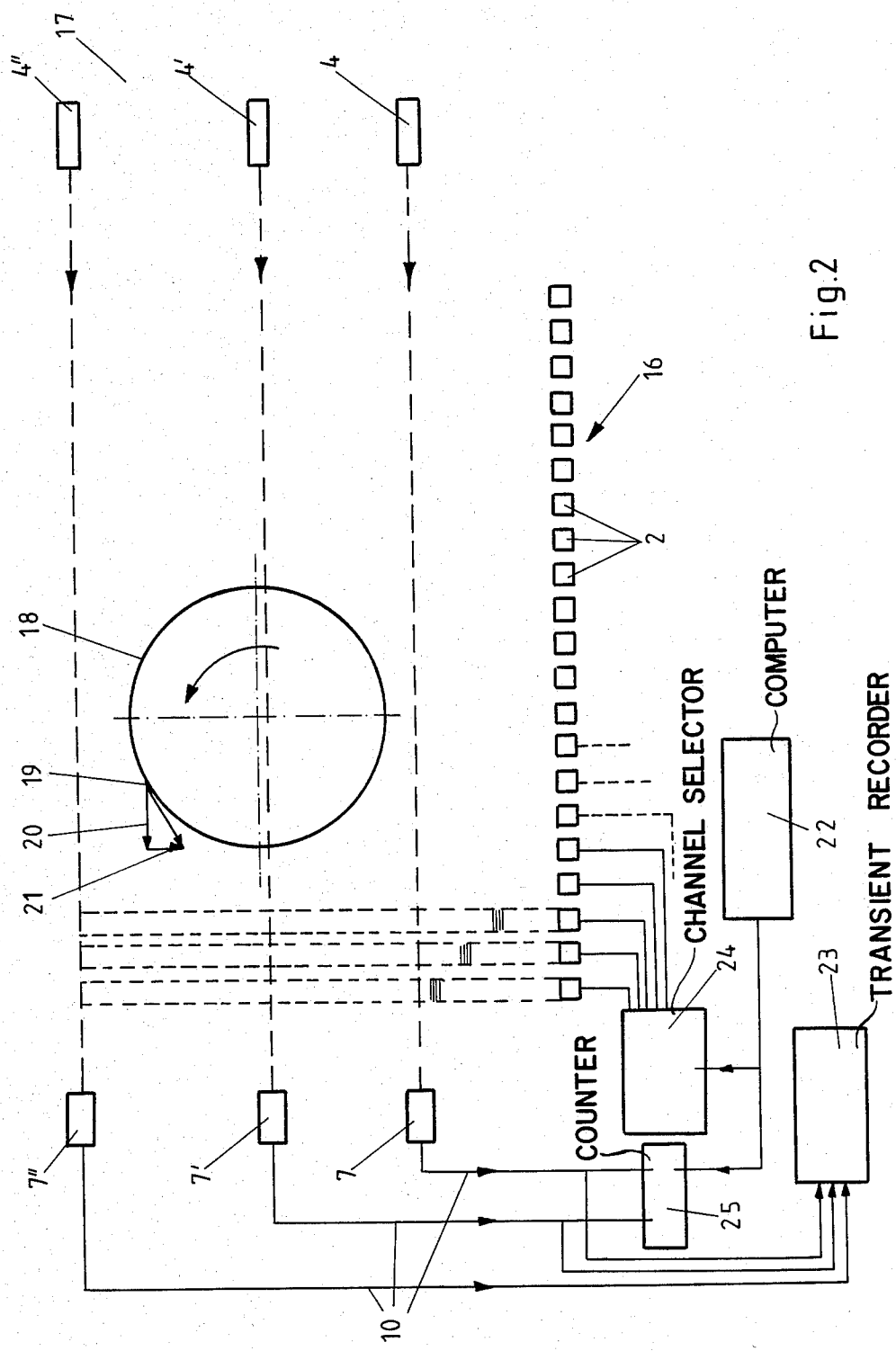
FIG. 2 is a schematic representation of the apparatus in the principal possibility of embodiment.

FIG. 2 is a schematic representation in which the principle is further explained, somewhat widened and made similar to [practical] equipment. A line (16) of a number of ultrasonic transmitters (2) is here arranged, and for example are arranged at equal, or nearly equal, mutual distances. At an angle to them, in particular at a right angle, is a line (17) of lasers (4), which are referenced 4, 4', 4'' to differentiate them. Pickup units (7, 7', 7'') are correspondingly provided. A respective laser (4) and a pickup unit (7) form a receiver (4, 7). The electronic part concerned of the registration and evaluation unit can also be further considered to belong to the receiver. In FIG. 2 it is to be illustrated how certain integration paths can be selected without resulting in a disturbance, due to the apparatus, of the flow in the respective flow field present, and not even in the edge region. If, for example, the pickup units (4, 7 and 4'', 7'') are chosen as the integration path, then an integration results over the whole region in which a vortex (18) is located. At the point (19) on the vortex (18), the two mutually perpendicular velocity components (20 and 21) are represented. Of course, the vortex possesses corresponding velocity components at each other point. In the arrangement shown, only the velocity component (21) can be measured or recorded with the equipment. For the velocity component (20), a further apparatus must be set at a right angle to it. By use of the receivers (4, 7 and 4'', 7''), the whole field including the vortex (18) is sampled. This sampling can take place sequentially or in parallel, i.e., the ultrasonic pulses are emitted successively or simultaneously. With simultaneous emission, a coded signal must be used, i.e. the individual ultrasonic pulses must be provided with a code such that they are, and remain, distinguishable from each other.

When, on the other hand, the receiver units (4', 7' and 4'', 7'') are applied as boundaries of the integration path, a narrower region is obtained which is scanned and measured, in which by chance only about half the vortex (18) is located in the example shown. This would be of no significance in itself, but shows the possibilities available, in that, for example, the integration can be chosen very short, in order to make possible a quasi-local determination of the velocity components, temperature, and the like. In this example of an embodiment, shown in FIG. 2, the evaluation unit which is connected in series with the ultrasonic transmitters (2) and the receivers (4, 7, 4′, 7′) is already of complicated construction. A computer (22), a transient recorder (23), a channel selector (24) and a counter (25) are utilized. The channel selector (24) sequentially sets off the ultrasonic transmitters (2) and hence successively starts the emission of the ultrasonic pulses. The transient recorder (23) records the received pulses which are received by the respective receiver units (4, 7, 4′, 7′, 4″, 7″). By means of the computer (22) it is possible to tell at any given time which receiver (4, 7) is driven by which ultrasonic transmitter (2).

Figure 3:
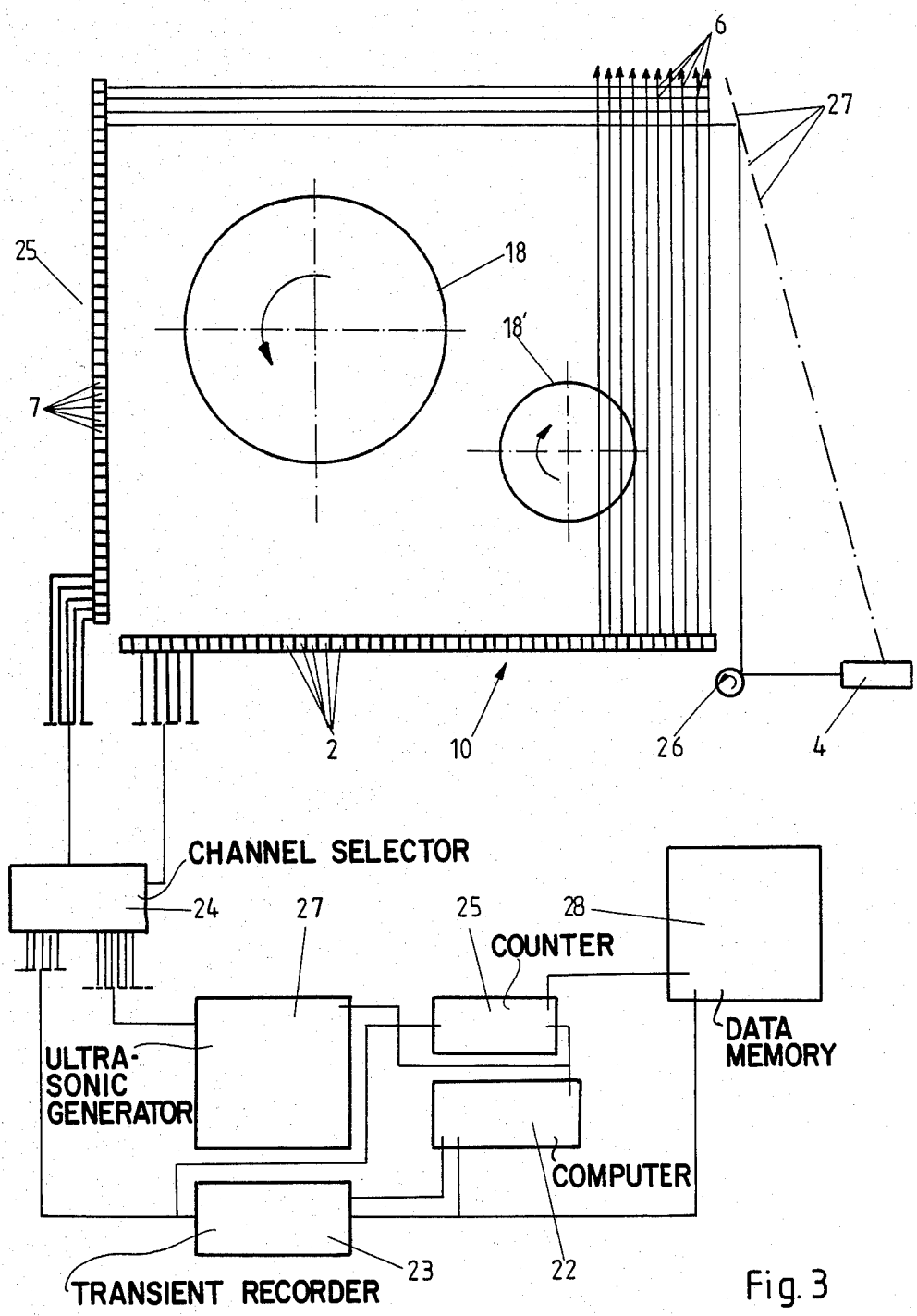
FIG. 3 is the apparatus in a possible embodiment for one-dimensional measurements.

According to FIG. 3, the line (10) of ultrasonic transmitters (2) is also provided. The receivers (7) are also arranged here in the form of a line (29). Only a single laser (4) is used, in connection with a rotating mirror (26) and a row of mirrors (27), so that the laser beam is split quasi-simultaneously into many single beams which are associated with the individual pickup units (7). Here a number of measurement points (6) result at each intersection point; they extend over the whole flow field and cover and include it pointwise. In this case two vortices, (18,18′) which can be separately scanned in this way, may be present in the flow field.

The following evaluation unit is here somewhat expensively constructed, and in fact with coding of the individual ultrasonic pulses, making possible a simultaneous radiation from all transmitters. Besides the equipment already shown in FIG. 2, there is here in addition a further ultrasonic generator (30) with different signal coding and also a large data memory (28), which are connected together in the manner shown. The computer (22) controls the transient recorder (23) and readies it for reception. Simultaneously the coded ultrasonic pulses are radiated out by means of the ultrasonic transmitter generator (27) and the individual ultrasonic transmitters (2). The channel selector (24) interrogates the pickup units (7) simultaneously or at a high sequence frequency. The individual travel time differences are retained in the large data memory (28) and are availble for later evaluation.

To summarize, a process and an apparatus for measuring travel time differences of ultrasonic pulses for the determination of flow fields, in particular of velocity components in gaseous media, uses a number of ultrasonic transmitters and a receiver for the ultrasonic pulses, as well as a following recording and pickup unit.

In order to measure travel time differences of ultrasonic pulses in the measurement region concerned, and to be able to select the measurement region without influencing the flow, one or more laser beams are used as receivers for the ultrasonic pulses; they are modulated by the ultrasonic pulses, and their modulation is recorded.

REFERENCE LIST

1 Ultrasonic generator
2 Ultrasonic transmitter
3 Arrow
4 Laser
5 Laser beam
6 Measurement point
7 Pickup unit
8 Schlieren optics
9 Phototransistor
10 Signal lead
11 Oscillograph
12 Digital memory unit
13 Return lead
14 Time generator
15 Trigger
16 Line
17 Line
18 Vortex
19 Point
20 Velocity component
21 Velocity component
22 Computer
23 Transient recorder
24 Channel selector
25 Line
26 Rotating mirror
27 Ultrasonic transmitter generator
28 Large data memory

We claim:

1. A process for determining flow field velocities in a gaseous media comprising the steps of transmitting at least one ultrasonic pulse and one laser beam through the media such that the laser beam intercepts and is modulated by the ultrasonic pulse, registering the laser beam with a receiver means, and registering the travel time of the ultrasonic pulse.

2. Process according to claim 1, characterized in that the modulated laser beam is conducted out of the flow field and registered only outside of the flow field.

3. Process according to claim 1, characterized in that ultrasonic pulses from mutually opposite directions are sent towards the same laser beam, for local temperature determination.

4. The process of claim 1 wherein a plurality of ultrasonic pulses and a plurality of pulse intercepting laser beams are transmitting through media as an intercepting line-by-line grid, and wherein modulations of each laser beam are registered.

5. The process of claim 1 wherein ultrasonic pulses of between 100 and 1,000 kHz are transmitted.

6. Apparatus for measuring travel time differences of ultrasonic pulses in the determination of gaseous media flow fields comprising, in combination, at least one ultrasonic transmitter for trasmitting ultrasonic pulses along a sonic path through the gaseous media, at least one laser for transmitting a laser beam through the gaseous media along a laser beam that intercepts said sonic path, a laser beam detector for detecting said laser beams after having intercepted said sonic path, and means for measuring the time from transmission to interception by the laser beam of the ultrasonic pulser.

7. Apparatus according to claim 6 comprising a plurality of ultrasonic transmitters for transmitting ultrasonic pulses along a plurality of non-intercepting sonic paths and at least one laser for transmitting a plurality of non-intercepting laser beams that intercept each of said sonic paths as a line-by-line grid.

8. Apparatus according to claim 7, characterized in that transmitters (2) and receivers (4, 7) are mutually arranged in three respective planes, for determination of velocity components in the three space directions.

9. Apparatus according to claim 6 wherein said laser beam detector ccomprises schlieren receiving optics and a phototransistor.

* * * * *